United States Patent
Wright, Sr.

(10) Patent No.: US 9,798,763 B2
(45) Date of Patent: Oct. 24, 2017

(54) METHOD FOR USING TAGS TO MANAGE CLIENT SOFTWARE ACROSS A LIFE CYCLE

(71) Applicant: David D. Wright, Sr., Santa Cruz, CA (US)

(72) Inventor: David D. Wright, Sr., Santa Cruz, CA (US)

(*) Notice: Subject to any disclaimer, the term of this patent is extended or adjusted under 35 U.S.C. 154(b) by 463 days.

(21) Appl. No.: 14/493,195

(22) Filed: Sep. 22, 2014

(65) Prior Publication Data

US 2015/0088834 A1    Mar. 26, 2015

Related U.S. Application Data

(60) Provisional application No. 61/881,296, filed on Sep. 23, 2013.

(51) Int. Cl.
  *G06F 7/00*     (2006.01)
  *G06F 17/00*    (2006.01)
  *G06F 17/30*    (2006.01)
  *G06F 13/14*    (2006.01)

(52) U.S. Cl.
  CPC .............. *G06F 17/30377* (2013.01)

(58) Field of Classification Search
  CPC .......... G06F 21/10; G06F 21/105; G06F 8/60; G06F 17/30067; G06F 17/30286; G06F 17/30289; G06F 21/6218
  USPC .......... 705/59, 57, 64; 707/999.01, E17.044, 707/705, E17.005, 661, 822, 827, 999.1, 707/999.104
  See application file for complete search history.

(56) References Cited

U.S. PATENT DOCUMENTS

| | | | | |
|---|---|---|---|---|
| 8,239,827 B2* | 8/2012 | Sobel | .................... | G06F 8/4441 717/118 |
| 8,429,187 B2* | 4/2013 | Theimer | ................... | G06F 8/77 707/769 |
| 8,717,165 B2* | 5/2014 | Gernandt | ........... | G06K 19/0705 340/539.13 |
| 9,311,586 B2* | 4/2016 | Robinette | .......... | G08B 13/1427 |
| 2001/0013024 A1* | 8/2001 | Takahashi | ............... | G06F 21/10 705/59 |
| 2009/0113397 A1* | 4/2009 | Wright, Sr. | ........... | G06F 21/552 717/127 |

* cited by examiner

*Primary Examiner* — Heather Herndon
*Assistant Examiner* — Cecile Vo
(74) *Attorney, Agent, or Firm* — Soquel Group LLC

(57) ABSTRACT

A computer-implemented method for using tags to manage software across a product life cycle, including storing by a server computer (i) a tag prototype database and (ii) a tag instance database, the method including the steps of creating a tag for a client software component, storing the tag in the tag instance database, receiving, by a client computer, the tag and the client software component, from an electronic software distribution computer, receiving a request from the client computer to initiate a session of the client software component, obtaining the tag, by the server computer, from the client computer, verifying the tag obtained from the client computer, updating the tag to include information about the session, and replacing the tag in the client computer with the updated tag.

17 Claims, 8 Drawing Sheets

METHOD FOR USING TAGS TO MANAGE CLIENT SOFTWARE ACROSS A LIFE CYCLE

TECHNICAL FIELD

Various embodiments generally relate to a system for tagging client software components in a software as a service (SaaS) environment.

BACKGROUND

Increasingly computer software is being delivered on a service basis, that is, rather than being distributed on media and installed by a user on their computer, it is provided from a service or computer facility across a network to the client computer and then installed or deployed. This model is typically referred to as Software as a Service (Saas). The software is typically licensed for use according to a number of entitlements, or conditions of usage. An alternative model is referred to as on premises software in which software is installed from and run on computers on the premises (e.g. in the building) of the person or organization using the software.

It is often desirable for a software service, either SaaS or on premise software, to be able to track, monitor and identify unique instances of client software provided by the service, either an SaaS client software component or an on premise installed software component. Such capability to monitor and identify deployed client software components can be used, for example, (1) to prevent piracy of client software components, (2) to prevent the use of the service, to the extent that the client software component may enforce, when not entitled, and (3) to ensure that the client software component is the correct version, patch level, appropriate software component by any definition, for the service in use.

One method for combating software piracy is to include a key, an encrypted or signed data element, with the software. The key is typically a static data element which can be verified at any time by a service or computer to ensure that it has not been tampered with. However, because the key is static it can't be modified to reflect life cycle information such as the type of usage, the amount of usage, and the like. Thus it would be advantageous to be able to verify client software components using a dynamic data structure that can be updated provide information concerning life cycle events.

Thus, it is with respect to these considerations and others that the present invention has been made.

SUMMARY OF THE DESCRIPTION

The invention described here allows the service to track, monitor or verify software component activity for the entire life cycle from deployment through to removal from service of the SaaS client software component (or any software component under control of a lifecycle manager). The life cycle includes any transitions such as patches and/or upgrades/changes to the client software component.

This invention uses a tagging technique to supply information to track on-going status of a software component over its life cycle.

The invention tags a client software component with an associated data structure, referred to as a tag, when the client software component is deployed for, or on behalf of, the service at client activation time. The tag is uniquely identified, time stamped and digitally signed. The unique identifier may be used to associate the tag and thus the client deployment with an entitlement managed by an entitlement management service.

The tag may be extended, modified, or replaced, by the service at any time during a service session. The client software component instance may be moved, e.g. as part of a virtual machine (VM) strategy, either during or between service sessions with no impact on the efficacy of information provided on the client software component. Time stamp management during sessions can be utilized to detect inadvertent or deliberate duplication of any client instance.

The tag contents can be used by the service to track status and usage. The tag may also be used by Software Asset Management (SAM) tools on the client side to supply SAM information to the client end user organization.

Various embodiments of the subject invention are directed towards a computer-implemented method for using tags to manage software across a product life cycle, including storing by a server computer (i) a tag prototype database that stores tag prototypes from which instances of tags are generated and (ii) a tag instance database that stores instances of tag, each instance of a tag corresponding to a client software component for use in a client computer, creating, by a server computer, a tag for a client software component, the tag corresponding to a tag prototype from the tag prototype database, storing the tag in the tag instance database by the server computer, receiving, by a client computer, the tag and the client software component, from an electronic software distribution computer, receiving a request from the client computer to initiate a session of the client software component, obtaining the tag, by the server computer, from the client computer, verifying the tag obtained from the client computer, updating, by the server computer, the tag to include information about the session, and replacing, by the server computer, the tag in the client computer with the updated tag.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Preferred Embodiment, which is to be read in association with the accompanying drawings, wherein.

DETAILED DESCRIPTION

Figure 1:
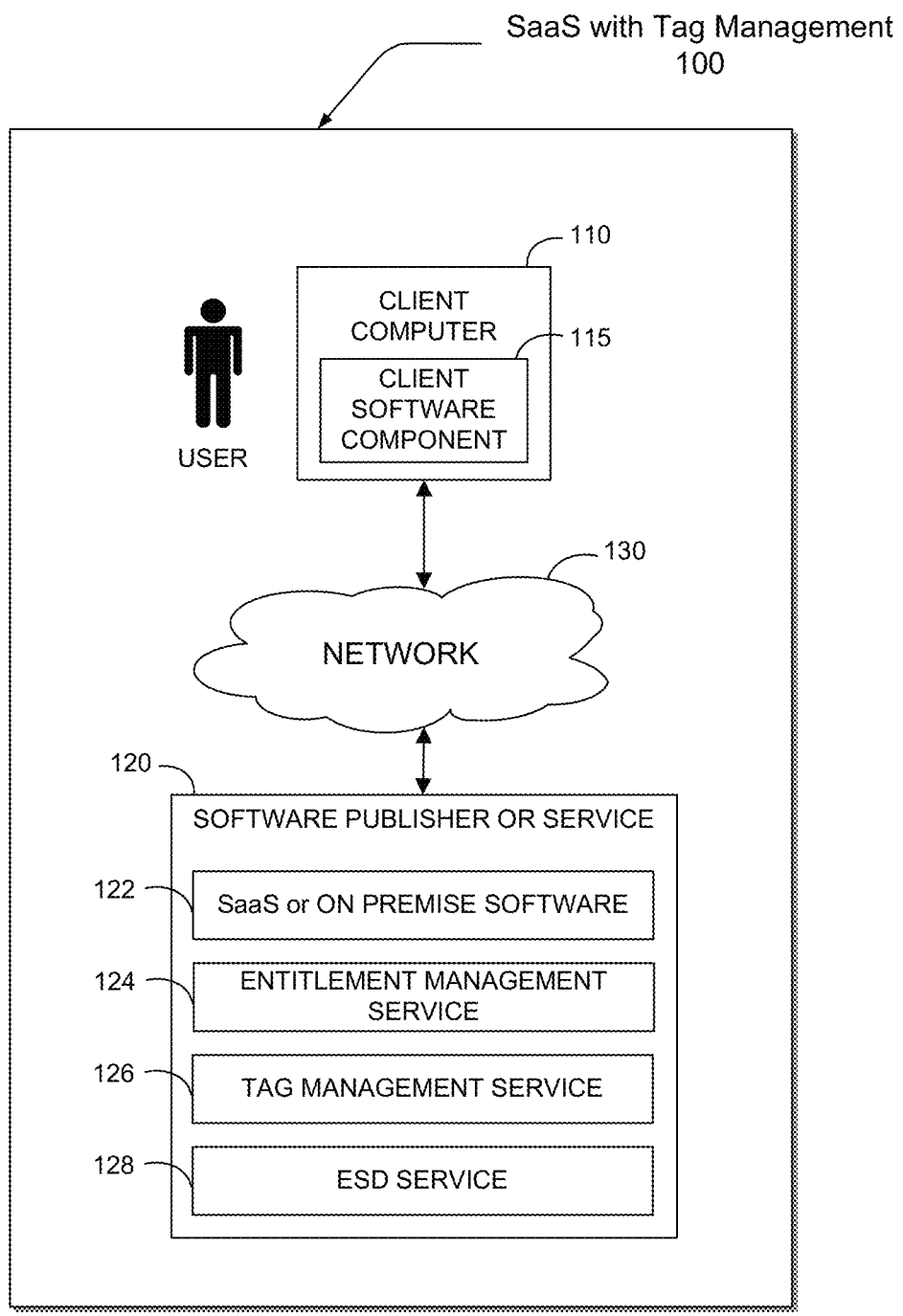
FIG. 1 is a generalized block diagram of a preferred embodiment of a system that includes a software publisher or service that distributes a client software component to a client computer and which uses a tag management service to identify, track and manage software components at each step of a service or software life cycle.

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods, processes, systems, business methods or devices. Accordingly, the present invention may take the form of an entirely hardware embodiment, an entirely software embodiment or an embodiment combining software and hardware aspects. The following detailed description is, therefore, not to be taken in a limiting sense.

As used herein the following terms have the meanings given below:

Software as a Service (SaaS)—means a computer application that is delivered to users on a service basis in which software components are delivered to a client computer from a network-based computing facility.

On premise software—means a computer application that is delivered from and run on computers on the premises (e.g. in the building or organization) of the person or organization using the software.

Client software component—a software module that is distributed from a SaaS service or from an on premise system for use in a client computer by a user.

Tag—as used herein is a data structure that is associated with a client software component, typically although not exclusively via a unique identifier. A tag typically includes static information, or attributes, that describe the nature of the client software component such as the component name, edition, version, etc., as well as dynamic attributes, that are modified during the life cycle of the client software component. For example, dynamic attributes may be modified when the client software component is deployed or activated. Further dynamic attributes may include metrics relating to the use of the component such as time active, work carried out, etc., either with respect to the component standalone, or in association with other identifiable components. The tag may also contain a reference to entitlements that specify rights to use the component in some fashion. A tag is typically created using a tag generation tool, or tag tool. The features and operation of such a tag tool are outside the scope of the subject invention unless otherwise indicated herein.

Tagging—refers to the operation of associating one or more tags to a client software component or document or piece of information.

Tag prototype—refers to a template from which a tag is created. There are certain attributes in a tag that remain static, i.e. which do not change over time, for instance, client software component name, version, description, possibly other attributes. Thus, the tag prototype forms the basis of and is used to create each new instance of a tag. Typically, instances of a tag includes additional information, i.e. in addition to the static attributes, such as creation date/time, association IDs, etc.)

Entitlement—means the set of one or more rights granted for the use or consumption of a tangible product, for example a hardware or software product, a unit of information or a service.

License—means the agreement between a user of a client software component and the provider or owner of the client software component. A license typically includes one or more entitlements that give the terms of usage of the client software component by a user. As used herein, a license is an agreement between the grantor and grantee that includes one or more entitlements that govern the rights of usage of a client software component by a user.

Session—also referred to as a user session or client session means a discrete instance of use or a period of use of a client software component. A session typically refers to a period of use of the client software component by a user. Sessions typically end when a user explicitly terminates use such as when they close a document or quite a program but may be terminated automatically after a period of non-activity.

Verification—as used herein means the identification of exceptions between a tag stored in a client computer, a corresponding tag stored by a software service and a policy for managing exceptions. As described hereinbelow with reference to FIGS. 5-7, verification is performed at least at the beginning and end of each session of a client software component. Verification refers to (1) the comparison between the tag on the client computer and tag stored by the service to determine if they are identical, and (2) if they are determined to be identical then an analysis of the tag attributes to see if there are exceptions relative to a pre-established policy. The policy governs any actions that are taken as a result of having identified an exception. For example, if the tag stored in the client is different than the tag stored by the service then the policy may be to alert an administrator that tampering has occurred. As another example, if the tag indicates that version 1 of a client software component is in use on the client computer but the most recent version is version 2, then the policy may dictate that a message be sent to an administrator suggested that they upgrade the client software component for that client computer. Generally, verification will determine matters such as if the client software component is of the right version or patch level, if the number of instances of a client software component are in conformance with the number of users or seats that have been licensed and the like. The tag management service presented herein allows such verification to be performed without dictating the policies that may be implemented should the verification process identify exceptions. Thus, the policy itself is outside the scope of the subject invention.

Tag Structure

Table 1 below provides an example of the attributes that may be included in a tag that is associated with a client software component. This list of attributes is intended to be exemplary and not limiting. A set of some or all of these attributes can be partially or completely encapsulated in a data structure and encrypted or digitally signed in order to provide a mechanism to detect tampering with the encapsulated attributes.

TABLE 1

Exemplary Tag Attributes

| Attribute Name | Description |
| --- | --- |
| Title | The name of a product or service as assigned by its manufacturer |
| Version | Version number of a product or service. |
| Creator | This attribute allows a software or service management process to identify the manufacturer that created the software service. |
| Licensor | The software licensor who issued the entitlement for the software component use and/or service. |
| ID | provides information that can be used to reference a specific version of a specific product or service. May be used to distinguish different upgrade levels. |
| Tag Creator | The identity of the tag creator for the component being tagged. |
| Abstract | A summary of the software package or service that this tag applies to. |
| Deployment Details | A set of attributes that provide the locations of the client software component as well as deployment instance details. |
| Entitlement Linkage | provides entitlement information and can be used as a means to connect an entitlement to this tagged client software component. |
| Serial Number | A unique identifier for the tagged instance of a client software component. . |
| Tag creator | Provides additional tag creator information in order to provide identification of previous entities that are related to the creation of the tag. |
| Tag Version | Used for management and audit during the tag life cycle (as against the software or entitlement life cycle). There may be multiple instances of this attribute as the life cycle progresses. |
| Usage Identifier | An identifier that indicates whether this instance of a client software component has been "activated", which is the first event in the usage of a client software component. This identifier can be used to determine, for instance, that the client software component has been deployed, but never activated, and thus has never been "used". This flag is not meant to provide any other metric of "usage" other than initial activation. |
| Deployment Details | Provides time/date of deployment, identification of deployment agent, etc. |
| Session Status | Indicates the state of client software component session. Set to "Init" when a service/client software component session commences, set to "closed" after an orderly session shutdown |

Generalized Operation

The operation of certain aspects of the invention is described below with respect to FIGS. 1-8.

FIG. 1 is a generalized block diagram of a preferred embodiment of a system that includes a software publisher or service 120, henceforth referred to as service 120, which distributes a client software component 115 to a client computer 110 and which uses a tag management service 126 to identify, track and manage software components at each step of a service or software life cycle. System 100 includes client software component 115 that runs in a client computer 110. Client software component 115 is provided across a network 130 by service 120. Generally, service 120 may be any service or computer system that provides client software modules to client computers for execution on a license basis. This includes inter alia cloud-based Software as a Service (SaaS) and on premise software systems. Service 120 is typically implemented as one or more computer servers accessible across network 130 via standardized web services or other defined application programming interfaces (APIs).

Service 120 includes a SaaS or premise software system 122, an entitlement management service 124, a tag management service 126, and an electronic software distribution (ESD) service 128.

SaaS or premise software system 122 is typically a cloud service or enterprise software service or system that provides applications such as ERP for use by a user using a client computer such as client computer 110 in a corporate or organization-wide network.

Entitlement management service 124 manages entitlements that define usage conditions for client software components, as previously discussed.

Tag management service 126 creates, tracks and manages tags that are injected into, or associated with, client software components such as client software component 115, to enable them to be individually identified, tracked and managed across the life cycle of service 120. In one embodiment, when a client software component is deployed a build tag is created from a tag prototype with any relevant deployment information, and assigned a unique serial number, and then placed on client computer 110 by tag management service 126 such that the tag is co-located with client software component 115 in a pre-defined location on client computer 110, typically in non volatile memory on disk. The tag is subsequently updated to reflect additional status information such as deployment of client software component 115. In one embodiment, management of tags is carried out entirely by tag management service 126, as tag management service 126 is "trusted", i.e. it is under the secured control of the service provider that provides service 120; whereas if logic located in client computer 110 is employed as part of tag management service 126 this is potentially an "untrusted" location, i.e. where the logic might be tampered with by an entity with access to client computer 110. In other embodiments, portions of tag management service 126 may run in client computer 110.

Electronic software delivery service 128 delivers a software "distribution" to client computer 110 for use by a user via electronic distribution (ESD), i.e. the distribution is transmitted across a network, or via physical media such as a CD, DVD or USB drive.

Figure 2:
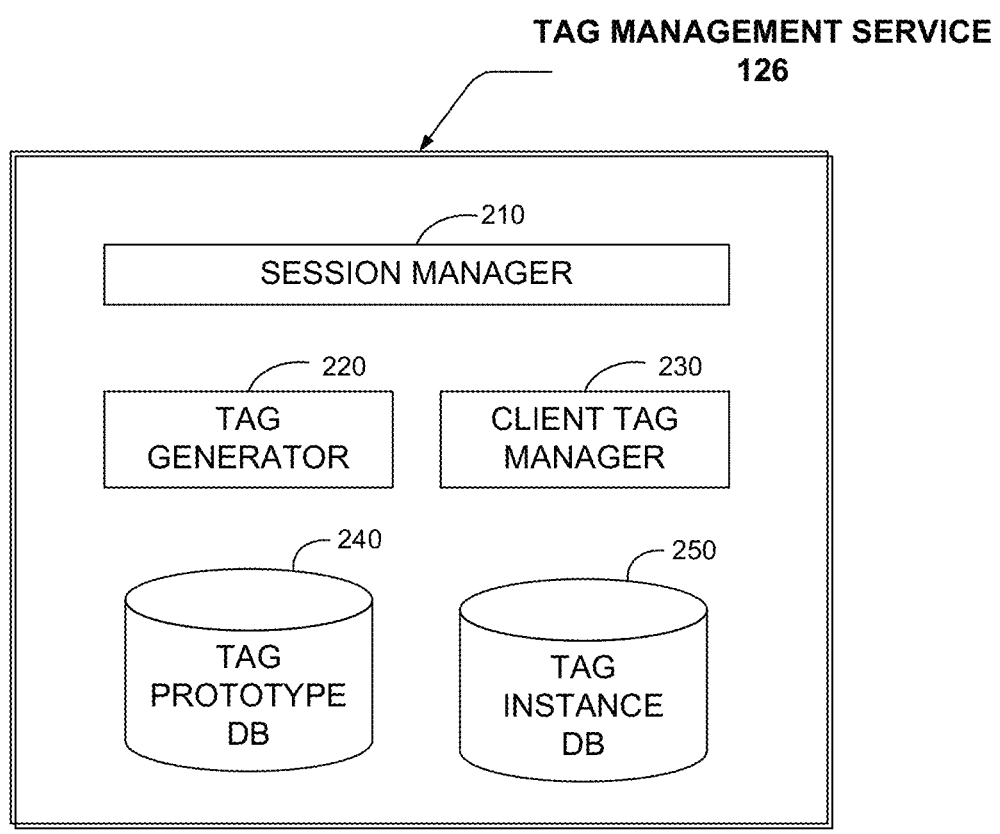
FIG. 2 is a generalized block diagram of a preferred embodiment of the modules included in a tag management service used by a software publisher system or service that distributes and manages client software components across all steps of the service or software life cycle.

FIG. 2 is a generalized block diagram of a preferred embodiment of the modules included in a tag management service 126 included in service 120 that distributes and manages client software components across all steps of the service or software life cycle. Tag management service 126 includes a session manager 210, a tag generator 220, a client tag manager 230 and two database services, tag prototype database service 240, and tag instance database 250.

Session manager 210 manages sessions between client computer 110 and tag management service 126.

Tag generator 220 creates tags and returns them to the requesting service.

In one embodiment, client tag manager 230 is considered a trusted source of computation. Client tag manager 230 performs updates to tags, digital signing of the tags as necessary, placing or moving tags to the appropriate location in client computer 110, and verification of tags.

Tag prototype database 240 stores tag prototypes and responds to requests for tag prototypes by returning the requested tag prototype.

Tag instance database 250 stores instances of tags, i.e. versions of tags that have been created and associated with client software components, and responds to requests for tag instances by returning the requested tag instance to the requesting service.

Figure 3:
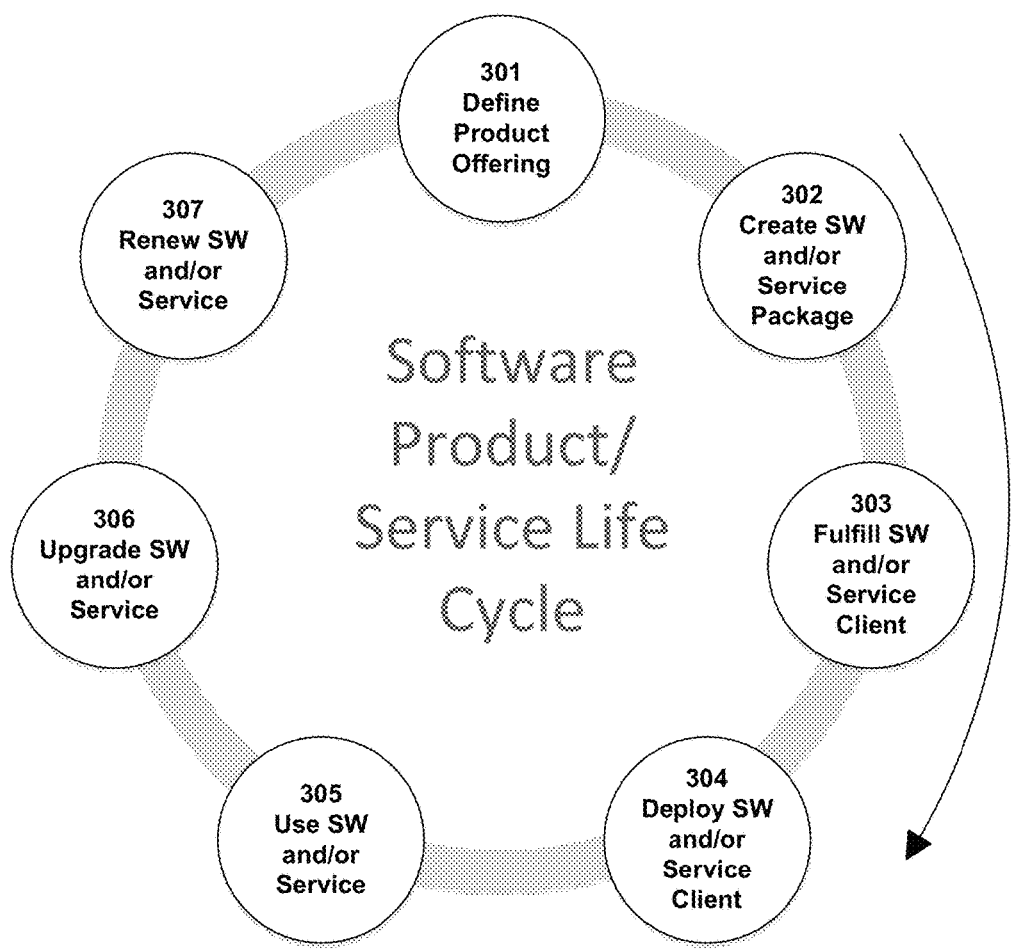
FIG. 3 illustrates a seven step life cycle of a software product or service.

FIG. 3 illustrates a seven step life cycle of a software product or service. It may be appreciated by one skilled in the art that a unique aspect of the subject invention is its ability to create a tag that corresponds to an instance of a client software component and to maintain and update the tag at each step in the life cycle of a product or service.

An initial step 301 or phase of the life cycle is to define a product offering. It may be appreciated that product offering refers to the definition of software components, including client software products, that make up the product or service. Further, as used herein a product offering includes client software components whose use is governed by entitlements. Additionally, when the term product is used it may also refer to a service, for example a ERP service provided under a SaaS model or to software provided using an on premise model. During this step, usually carried out by product management staff using specialized software tools, a software product offering is defined. This step includes defining the client software components that are to be distributed to users. This may include defining configuration information, add-on features, meters, suites etc. At this time, a software tool may be used to define the configuration and the set of tags associated with client software components included in the product offering.

It may be possible, with the appropriate tag architecture, i.e. tag data model and design, to create a one-to-one or many-to-one correlation between SaaS Entitlements and tag prototypes. Doing so will allow a unique tag that is generated later in the life cycle to be associated with an entitlement. If it is possible to create this association, the information generated as a result can be invaluable when deployments and usage are reconciled with entitlements during the product or service usage cycle.

At step 302 a distribution is created and configured, i.e. the downloadable version of the client software component, also referred to as a software package. As a distribution is built prior to shipping to users, a "build tag" is created, typically by a tag creation tool. The build tag is created for inclusion in a distribution that is shipped to one or more client computers. A build tag refers to the initial tag included in or provided with a client software component; the build tag is subsequently modified as a result of events that occur during the lifecycle of service 120, to include deployment information.

As part of this step, entitlements may be associated with the product or service package. Examples of entitlements include:

A time period for use of a client software component.

A time period of support for a client software component.

A period during which content such as book, movie, audio, or anti-virus profiles, may be accessed.

The maximum number of users to which the client software components can be provided, or fulfilled.

The entitlement is subsequently granted through an entitlement transaction, described in further detail hereinbelow, that entitles a user to be licensed to use a client software component. Typically, this entitlement transaction is uniquely identified by a entitlement identifier. Thus, an entitlement by a user to use a software client component may also be uniquely identified. Tagging the client software component with an entitlement identifier that is associated with the unique entitlement enables the tag and the entitlement to be associated throughout the life cycle of the client software component. This structure allows the entitlement to be traced and audited, which is especially helpful in the case that a grantee has many instances of the same kind of entitlement acquired via different means.

Next, at step 303, the software is fulfilled, i.e. provided to client computer 110. Fulfillment may be performed in a variety of ways. For example, an end user may receive the client software component and tag fulfilled together either via an electronic software delivery (ESD) service, for example by downloading the software from a website; alternatively the software may be pushed, i.e. transmitted, to the end user in some electronic fashion. In addition to ESD, software may be fulfilled, i.e. delivered, on "hard" media, for example on a CD, DVD or USB drive.

Figure 4:
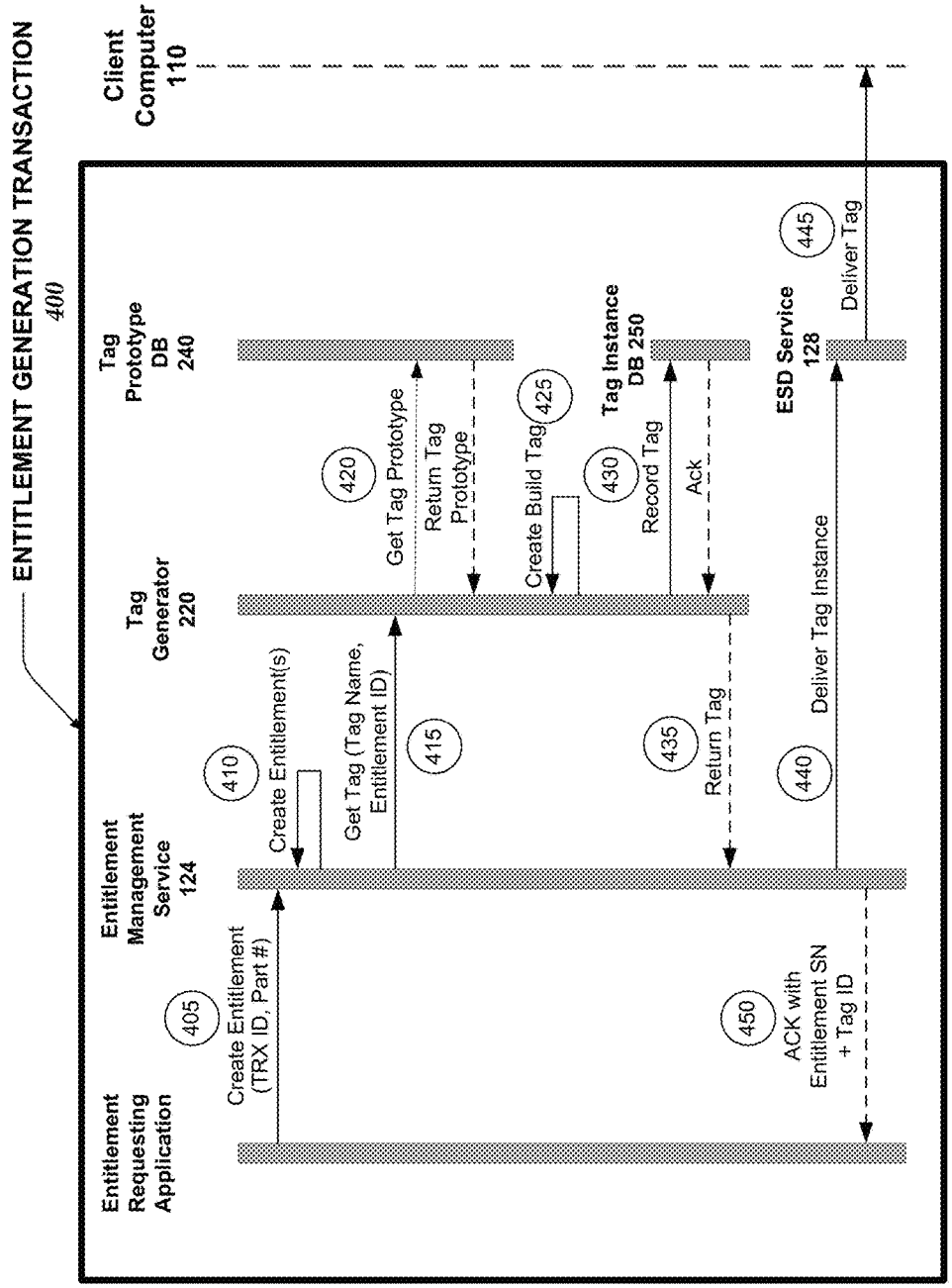
FIG. 4 illustrates an entitlement generation transaction in which an entitlement is created and the appropriate tags are generated and provided to the client computer for subsequent use.

As a result of a business transaction, one or more entitlements are created through a create entitlement transaction, as illustrated in FIG. 4, and described hereinbelow. An example of a business transaction which results in an entitlement being created is the sale or license of a software product that includes client software component 110. The sale and its corresponding business transaction can be considered as an "entitlement granting event." Typically such a transaction has a unique ID, separate from the ID of the entitlement itself, which may be included in a tag.

As part of this step, tag management service 126 delivers to client computer 110, an appropriate tag, as described with reference to FIG. 4.

In one embodiment, service 120 includes only the above mentioned build tag with distributions, with each build tag modified, relative to its corresponding tag prototype, to indicate the build version, unique serial number, and possibly other associated information such as the time and date of the build, build authorization information. This enables the end-user and/or service to identify precisely the software component product which is eventually used within the customer infrastructure. In this embodiment, the build tag and its corresponding client software component 110 is not associated with an entitlement. This approach may be useful, for example, in the case where client software component 115 is licensed for unlimited use throughout an organization, i.e. a form of site license, and it is not important to track or manage entitlement at a granular level.

In a second embodiment, a build tag is created and entitlement information is included in the build tag. In this second embodiment, the tag, will include the entitlement ID, the entitlement transaction ID, or both. In this second approach, the build tag included with the client software component 110 distribution includes the entitlement information within the build tag. Associating a client software component with an entitlement, via its tag enables service 120 to manage usage policies, as defined by the entitlements, for the client software component.

Until client software component 115 is installed and resident in client computer 110, client software component 115 is not yet deployed, i.e. is not yet ready to put into use. Thus, deployment is necessary prior to use. As part of deployment, an associated tagging transaction is performed, as illustrated in and described in reference to FIG. 5. Deployment may be accomplished in a variety of ways. In one approach, the end user deploys the client software component 115 and tag on client computer 110 using a deployment tool that is normally included with the client component software 115. An example of such a deployment tool is INSTALLSHIELD by Flexera Software LLC, which is commonly used by software vendors. During this process, the tag may have deployment information added, such as time, location, etc., as discussed with reference to FIG. 5. As a result, the tag is transformed into a uniquely identifiable "deploy tag", i.e. an updated version of the tag that includes deployment information.

Next, at step 305 the client software is placed into operational use, i.e. it is used by a user. A continuous period of use by a user is referred to as a session. There are two tag events or transactions associated with a session during the deployment phase: a session initiation transaction, described in further detail with reference to FIG. 6 hereinbelow, and a session termination transaction, described in further detail with reference to FIG. 7 hereinbelow.

Typically, a tag includes an attribute that defines characteristics of product usage, as shown in Table 1 hereinabove. During deployment, this attribute may be updated with information, which when collected or harvested, enables service 120 to execute algorithms that can measure level of activity or usage.

At step 306 of the life cycle the software or the service may be upgraded, for example by providing patches to client software component 115. Patching or upgrade of client software component 115 may occur either by a standalone process supplied with the client software component, or by the service provider as a remote process into the end user's environment. If a patch or upgrade to client software component 115 is performed then the corresponding tag is updated to reflect the changes to client software component 115. These changes to the tag are also recorded within service 120.

The capabilities of service 120 may change over time such that client software component 115 may have to be updated in order to support the change in capabilities. The tag may be used as a verification mechanism that allows service 120 to enforce a policy that may be in place if exceptions are detected by the verification process.

At step 307 the client software may be renewed, i.e. its license may be extended to allow for continued use. Acquiring a renewal via a business transaction, e.g. purchasing an additional 12 months of use, will result in the issuance of a new entitlement which can be associated with previous renewals and even perhaps other entitlements such as license entitlements. A service can consist possibly of SaaS, maintenance, content for some application (signatures for security issues, mapping updates, document updates etc.) or possibly combinations thereof.

The resulting action causes a new entitlement, linked to the original entitlement, to be recorded by EMS 124.

While the terms build tag, fulfilled tag, and deploy tag are used to refer to a tag associated with client component software 115, in a preferred embodiment each of these refer to the same data structure; thus a single tag is maintained for a unique instance of client software component 115. In other embodiments, these terms may refer to different tags that are maintained in client computer 110.

Entitlement Generation Transaction

FIG. 4 illustrates an entitlement generation transaction 400, performed at fulfill software step 303, in which an entitlement is created and the appropriate tags are generated and provided to the client computer for subsequent use.

At step 405 an entitlement requesting application, i.e. any application that licenses software based on entitlements for use by an end user, creates a entitlement request. This is typically a message that includes information such as a unique transaction identifier, referred to in FIG. 4 as TRX ID, and an entitlement part number, referred to as Part #, that identifies that client software component for which the entitlement is requested.

At step 410 entitlement management service 124 creates and stores an entitlement record in an entitlement database. While the operation of entitlement management service 124 is generally outside the scope of the subject invention, the steps of creating an entitlement is fundamental to the entitlement generation transaction 400 and is discussed in that context. The entitlement specifies the usage terms that are being licensed and includes transaction information such as the TRX ID and Part # that enable this instance of an entitlement to be uniquely identified. The action of creating an entitlement at step 410 enables a sequence of tag management transactions, described in reference to FIGS. 5-7, to be performed during deployment client software component 115. Thus, taken together FIGS. 4-7 specify a sequence of tag management transactions that enable management of entitlements for client software components across all steps of the service or software life cycle.

At step 415 entitlement management service 124 issues a request to tag generator 220 to get a tag that corresponds to the specified entitlement. It may be appreciated that more than one tag may be required to fulfill the request thus the term tag at step 415 and subsequent steps may refer to more than one tag. As a consequence, at step 420 tag generator 220 requests a tag prototype from tag prototype database 240 and tag prototype database returns the requested tag prototype.

At step 425 tag generator 220 creates a build tag from the returned tag prototype by adding passed parameters generated during the entitlement creation transaction. Parameters may include a transaction number, entitlement ID, and the like.

At step 430 tag generator 220 records the newly created build tag, which is an instance of a tag, in tag instance database 250, which returns an acknowledgement. Tag generator 220 then returns the build tag, at step 435, to entitlement management service 124.

At step 440 EMS 124 provides the build tag to ESD service 128 for fulfillment to client computer 110.

At the conclusion of this step either a "fulfilled" tag is associated with the entitlement transaction, or a static build tag is created, linked to the entitlement transaction, and recorded. The fulfilled or build tag is delivered to client computer 110 along with client software component 115.

Figure 5:
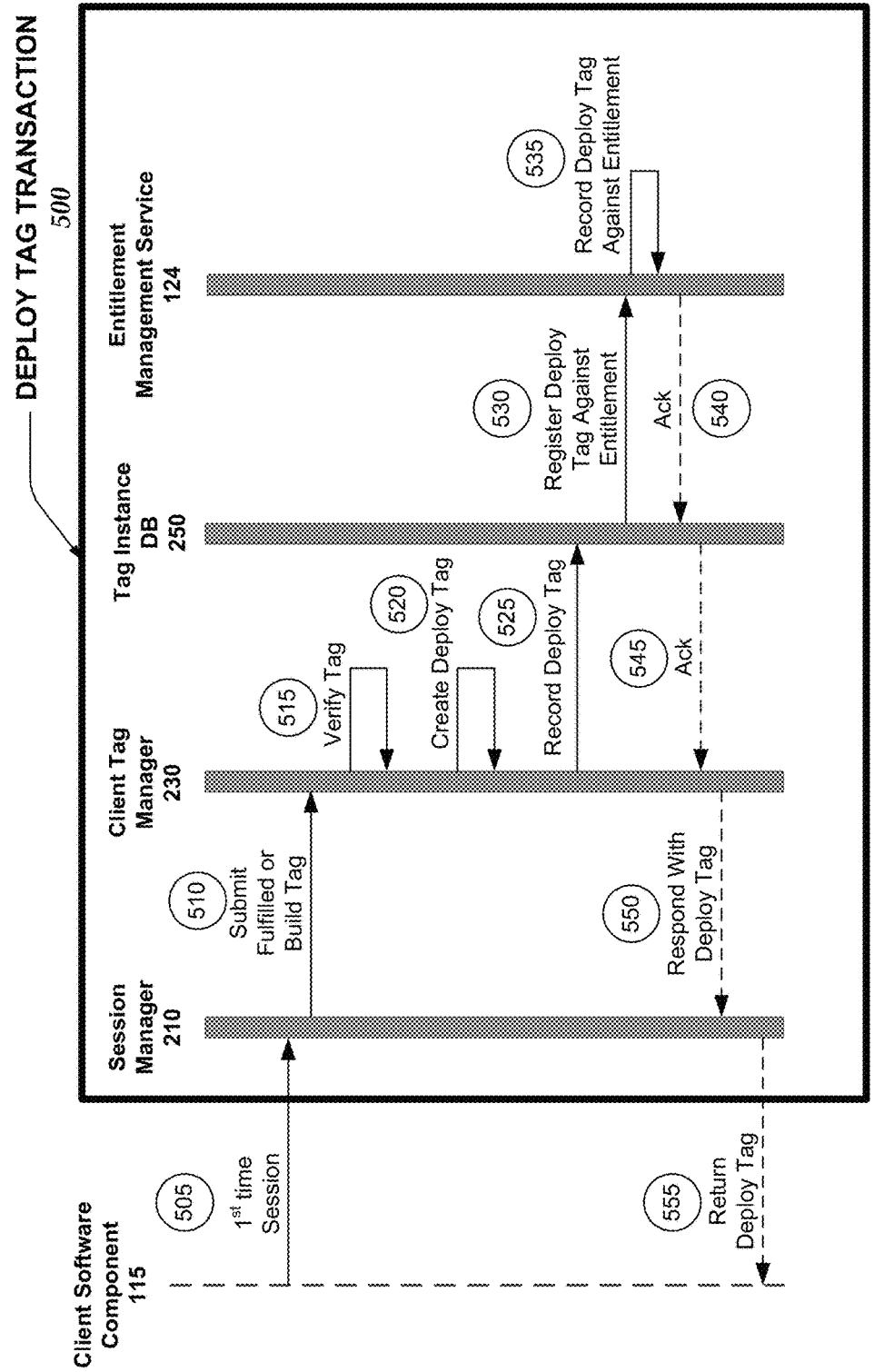
FIG. 5. illustrates a transaction performed by the tag management service to transform a "Fulfilled" or "Build" tag to a "Deployed" tag.

FIG. 5 illustrates a transaction performed by tag management service 126, performed at step 304 of FIG. 3, to transform a fulfilled or build tag to a deploy tag.

To initiate a first user session of client software component 115, client software component 115 initiates deploy tag transaction 500, by sending a 1st time session request 505 to session manager 210. The sequence of steps performed as part of deploy tag transaction 500 ensure that the Fulfilled or Build tag, which is now resident on the client computer is transformed into a "deploy" tag by adjusting the appropriate tag attributes, e.g. unique tag identifier, deployment information, time stamp, signature, as indicated in Table 1 hereinabove.

At step 510 session manager 210 obtains the build or fulfilled tag from client computer 110 and submits it to client tag manager 230. Client tag manager 230 verifies the received tag against the corresponding tag in tag instance DB 250 at step 515. At one level, verification ensures that the client software component and tag have not been tampered with by checking whether the tag obtained from client computer 110 is identical to the tag stored in tag instance DB 250. Verification can also check the tag relative to predefined criteria such as: valid tag attribute values for the software component per Table 1, valid signature, and the like. Verification also identifies exceptions such as whether usage is in conformance with the licensed entitlement. This verification process is performed for each transaction, as described in reference to FIGS. 5-7, after successful deployment of client software module 115. Thus, discrepancies are identified as part of each usage event associated with client software module 115 as long as it remains deployed.

As part of verification client tag manager 230 may determine if the client software component is of the correct version, patch, etc., for use with the current version of service. At step 520 the fulfilled or build tag is modified by the service, by adding deployment information such as the date and time of deployment, and replaced on the client computer to create a deploy tag. The previous fulfilled or build tag is archived on the client computer.

At step 525 client tag manager 230 records the event of tag modification to the newly created deploy tag in tag instance database 250.

At step 530 tag instance database issues a message to entitlement management service 124 to register, or record, the deploy tag against, or in association with, the corresponding entitlement.

At step 535 entitlement management service 124 records the deploy tag against the entitlement.

At step 540 entitlement management service 124 provides an acknowledgement of having successfully (or unsuccessfully) recorded the deploy tag against the entitlement.

At step 545 tag instance database 250 conveys the acknowledgement to client tag manager 230.

At step 550 client tag manager 230 responds by providing the deploy tag to session manager 210 which in one embodiment, at step 555, provides it to client software component 115 to be stored for further use. In other embodiments, at step 555 session manager 210 stores the tag directly in client computer 110.

Figure 6:
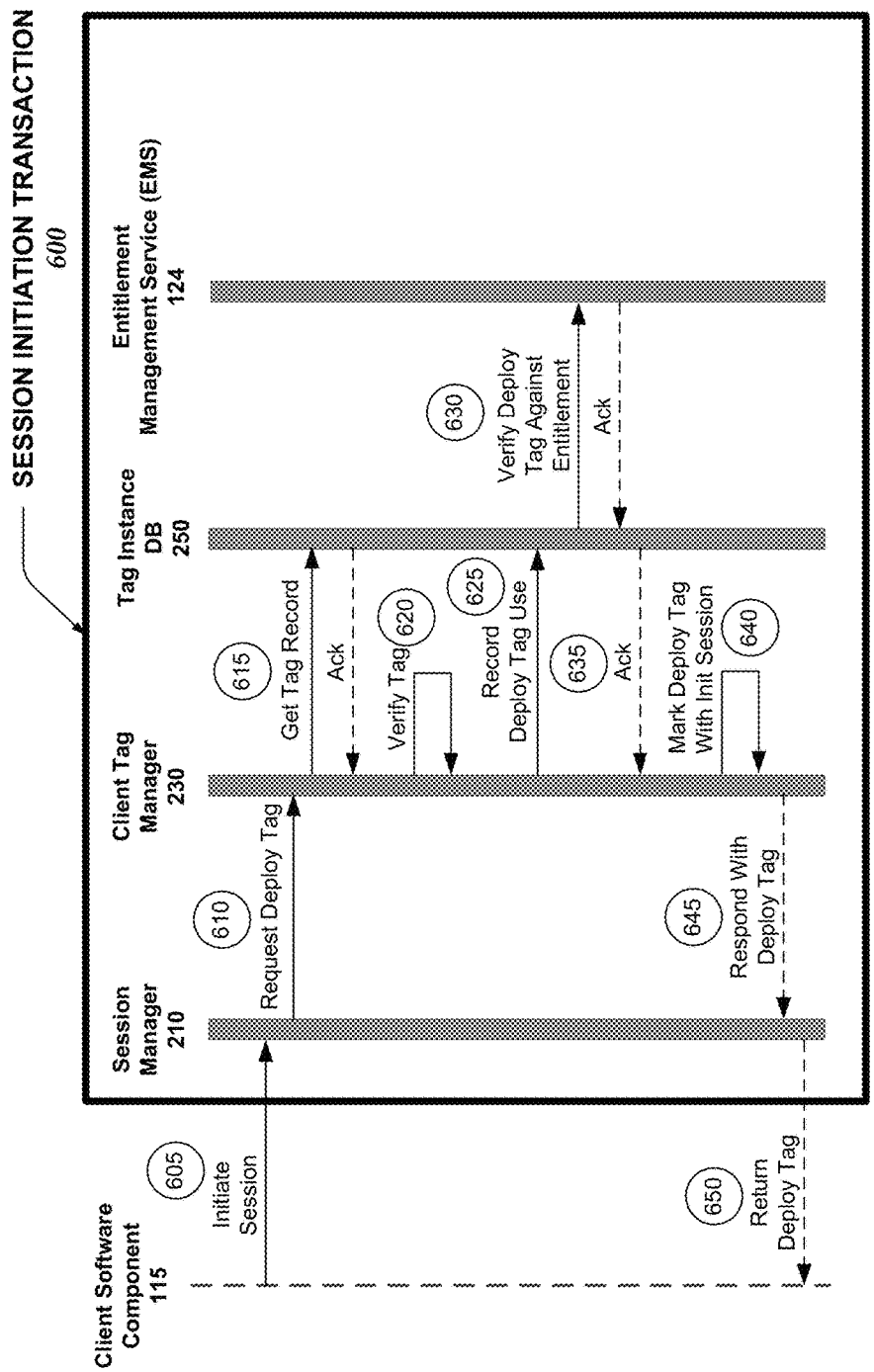
FIG. 6. illustrates a illustrates a session initiation transaction performed when opening a session in which a client software component is to be used.
Figure 7:
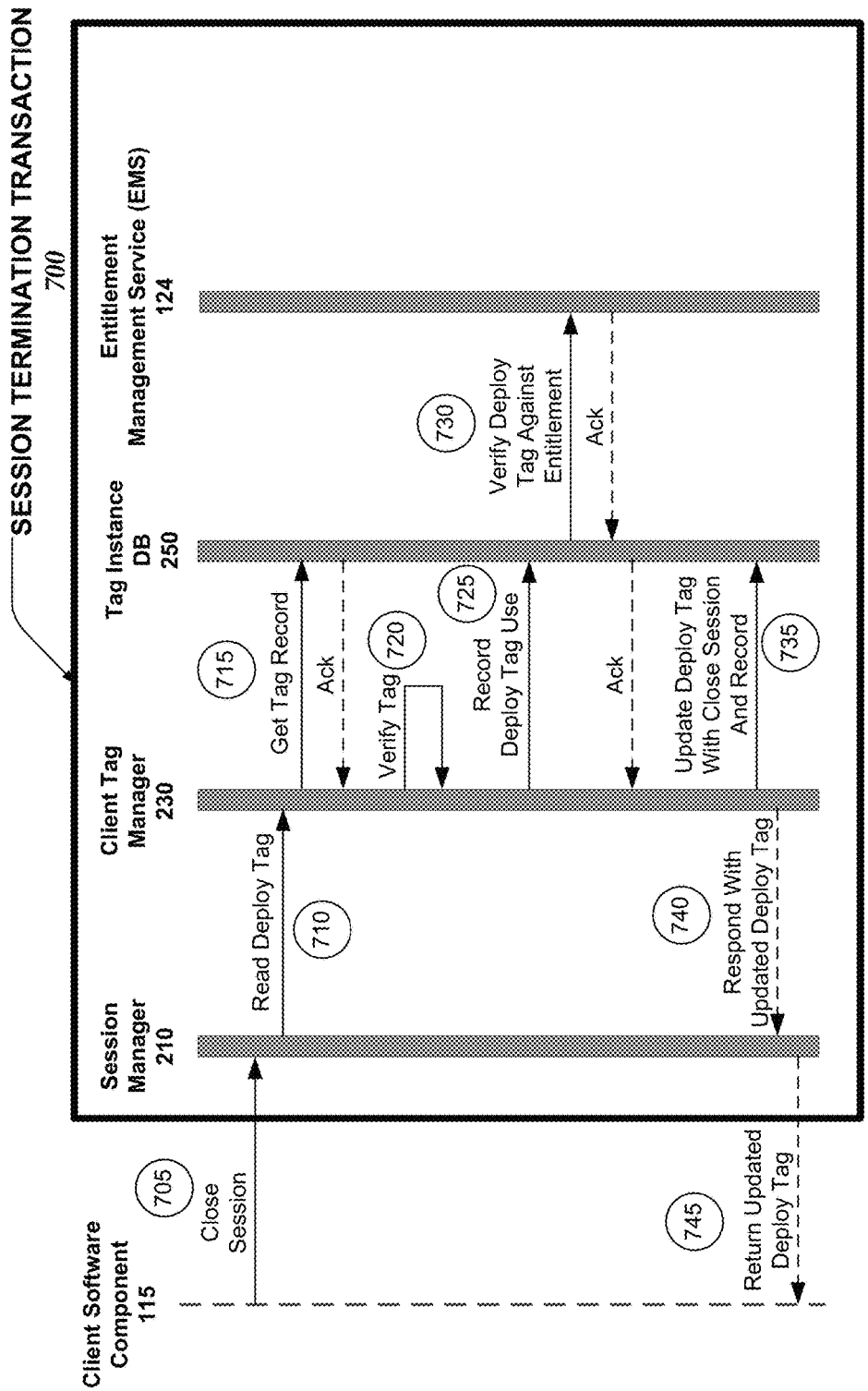
FIG. 7 illustrates a session termination transaction performed when closing a session in which the client software component was used.

Generally, there are various ways in which an updated tag may be provided or stored in client computer 110, at step 555 and also at step 650 of FIG. 6, and step 745 of FIG. 7. In one embodiment, service 120 has direct access to the location of the tag in the nontransitory memory or disk of client computer 110 (via a tool such as FTP). Further, in these mirror steps, the previous version of the tag is placed in an archive in the client environment to allow a SAM tool in the client environment to "harvest" usage information on the client side for the end user if requested. It may be appreciated that there is one valid tag for client software component 115 at any point in the life cycle.

At the conclusion of the transaction depicted in FIG. 5 and represented by step 304 of FIG. 3, a deploy tag, associated with an entitlement transaction, has been created and recorded within the tag management service 126 and stored in client computer 110 for subsequent use.

Session Initiation

FIG. 6 illustrates a session initiation transaction 600, which is executed as part of step 305 of FIG. 3. At session initiation, client software component sends a deploy tag to session manager 210 at step 605 as part of the session preamble/setup.

At step 610 client tag manager session manager 210 requests the deploy tag from client tag manager 230 which in turn, at step 615 gets the deploy tag record from tag instance database 250.

At step 620 client tag manager 230 verifies the tag, as described with reference to FIG. 5 hereinabove, with the additional step of verifying the tag against its associated entitlement in EMS 124. At step 625 client tag manager 230 records the event in the tag instance database by updating the deploy tag with deployment details. As this is the first usage "event" for client software component 115, at a minimum, the deploy tag usage identifier, included in Table 1 above, is updated to indicate that client software component 115 has been "used."

At step 630 tag instance database 250 verifies the deploy tag against entitlement. In one embodiment, if the deploy tag contains the entitlement ID, i.e. it was not originally a static build tag, then it will contain an entitlement ID. In this case, EMS 124 verifies that the deployment has an entitlement that is valid; verifying validity may include determining that the entitlement has not expired, or that the maximum number of allowed users hasn't been exceeded, and thus use by client software component 115 is entitled. As part of this step tag instance database requests information about the entitlement associated with the deploy tag in order to verify the tag against the entitlement. Further, tag instance database issues an exception message to EMS 124 if an exception relating to the entitlement is detected, i.e. if the usage conditions have been violated by client software component 115.

At step 635 tag instance database acknowledges that the deploy tag has been verified against an associated entitlement.

At step 640 client tag manager modifies the session status attribute of the deploy tag with "Init Session" to indicate that a session has commenced.

At step 645 client tag manager responds to the read request by providing the deploy tag to session manager 210 which in turn, at step 650, provides the updated deploy tag to client software component 115 for subsequent use. There are various mechanisms for providing the deploy tag to client software component 115.

Should the session be closed outside of a client requested termination, the tag will reflect this state in both client and as well as in the server side tag management system. The policy for managing this state is outside the scope of the subject invention.

Session Termination

FIG. 7 illustrates a session termination transaction 700 performed when closing a session in which client software component 115 was used. Session termination transaction 700 is performed as part of step 305 of FIG. 3. The session termination transaction 700 may be initiated by either the client software component 115 as a result of some action in the client side of the client/service interaction, or may be initiated by the service side of the session, i.e. by service 120, as a result of a service event. In any event, however session termination transaction 700 may be initiated, the termination sequence commences with a close session request at step 705 issued by client software component 115. The deploy tag is read or obtained by session manager 210 from client computer 110 at step 710 as part of an orderly session termination sequence. At step 715 client tag manger 230 gets the corresponding tag from tag instance database 250. then, at step 720 client tag manager 230 verifies the tag.

At step 725 the close session event is recorded in tag instance database 725, and the deploy tag is verified against the entitlement at step 730. At step 735 the deploy tag is updated with session close information such as time stamp and status "Closed" and recorded to tag instance database 250. Thus, at step 735 the update to the tag itself is performed, which will then be stored in client computer 110. This ensures that the same session termination information exists on both the client side and the service or server side so that at the next session start, the client-side and service/server side tags can be compared to verify that they are the same. This verification mechanism enables tag management service 126 to ensure that both client software component 115 and its tag remain unchanged between sessions. For instance if someone, e.g. a duplication program, copied client software component 115 and its corresponding tag to another client computer, the service would be able to detect that there were now two instances, at least when the second instance was started. Assuming that the associated entitlement did not allow for duplication, service 120 could take an appropriate action upon detecting the duplication.

At step 740 the updated tag is returned to session manager 210 which in turn provides the updated tag to client software component 115 at step 745.

As previously described, there are various mechanisms by which session manager 210 may provide the updated tag to client software component 115. As with all events that result in a modification to or updating of the tag, the previous version of the tag is placed in an archive in the client environment to allow a software asset management (SAM) tool running in client computer 110 to "harvest" usage information if requested.

At the conclusion of a successful session termination transaction 700 the deploy tag associated with an entitlement transaction has been created and recorded by service 120 and also placed in client computer 110 for subsequent use. Thus, when a new session is initiated by client software component 115 at a later time the previous session information has been persisted between sessions in both client software component 115 side within the stored tag and on the service side, i.e. in service 120, within tag instance database 250. The information may be used to authorize a continuous logical service session across multiple sessions (if required), as well as prevent unauthorized access service 120 at session initiation by a client software component that does not carry the correct communication termination data in the tag as the result of a previous orderly communication session termination.

Figure 8:
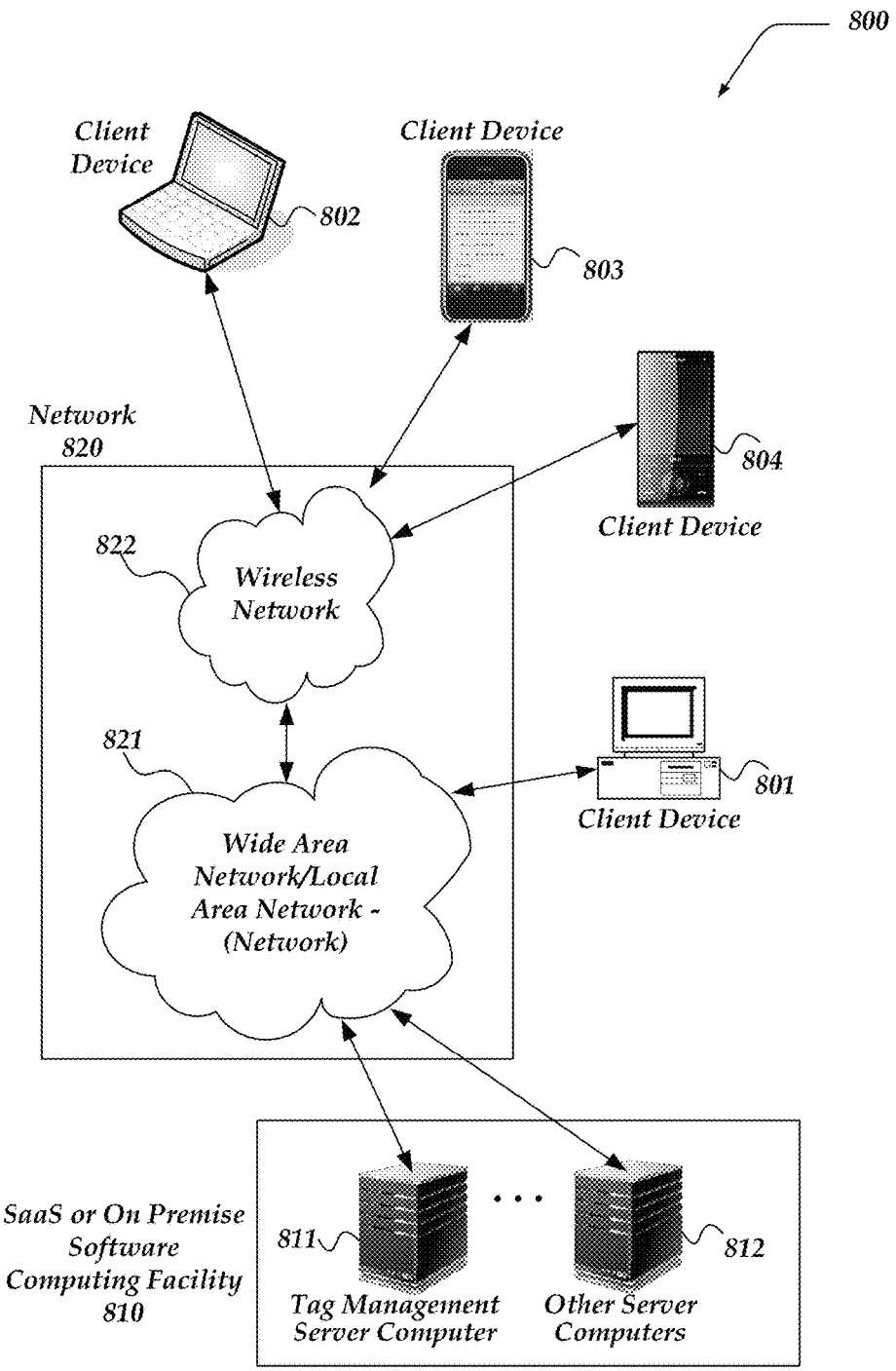
FIG. 8 is a system diagram that illustrates one exemplary environment in which the invention may be practiced.

FIG. 8 is a system diagram that shows one exemplary environment in which the invention may be practiced. Not all of the components illustrated may be required to practice the invention, and variations in the arrangement and types of the components may be made without departing from the spirit or scope of the invention. As illustrated in FIG. 8, system 800 includes a network 820 that includes a wide area network ("WAN")/local area network ("LAN")–(network) 821, a wireless network 822, several client devices 801-804, and a SaaS or On Premise Software computing facility 810, referred to henceforth as computing facility 810. Computing facility 810 includes a tag management server computer 811 and one or more other server computers 812.

Client devices 801-804 illustrate multiple embodiments of client computer 110, each of which connects to network 820. Network 820 is one embodiment of network 130. Computing facility 810 illustrates one embodiment, or implementation, of service 120 in which tag management service 126 is implemented by tag management server computer 811 and the other services in service 120 run on one or more other server computers 812.

Generally, client devices 801-804 include any computing devices that are capable of receiving and sending messages over a network, such as network 820. Client devices 801-804 include personal computers, multiprocessor systems, microprocessor-based or programmable consumer electronics, mobile devices such as mobile telephones, smart phones, display pagers, tablet computers, handheld computers, laptop computers, wearable computers, or the like.

Client devices 801-804 includes a computer processor (CPU) and nonvolatile data storage for storing program code and data. Data storage may include virtually any mechanism usable for storing and managing data, including but not limited to a client software component, a file, a folder, a document, a web page or an application, such as a database, digital media including digital images and digital video clips, and the like.

Data storage may further include a plurality of different data stores. For example, data storage may store updated tags, archived tags and software and tag usage data. Further, data storage may also include network storage or cloud storage in which the physical storage media is accessed across a network.

Tag management server computer 811 further includes a network interface, also referred to as a network adapter, network interface card or transceiver, for transmitting and receiving digital data across network such as wireless network 822, or network 821.

A Web-enabled client device can communicate across the Web. It may include a browser application that is configured to receive and to send web pages, web-based messages, or the like. The browser application may send, receive and display graphics, text, multimedia, or the like, employing a network protocol such as Hypertext Transfer Protocol (HTTP) and/or wireless application protocol (WAP).

Client devices 801-804 may include client application programs that send and receive content to/from other computing devices. Examples of application programs include calendars, browsers and email clients and so forth. Client devices 801-804 may be configured to receive via an electronic software distribution (ESD) service such as ESD service 128 a client software component 115 that implements a tag management system such as that described in FIGS. 1-7 hereinabove.

Wireless network 822 is configured to couple client devices 802-804 with network 821. Wireless network 822 may include any of a variety of wireless networks that provide a connection for client devices 802-4. Such networks may include the wireless Internet, mesh networks, wireless LAN (WLAN) networks, cellular networks, or the like. Wireless network 822 may further include network devices such as gateways routers, or the like. In essence, wireless network 822 may include virtually any wireless communication device or mechanism by which enables information to travel between client devices 802-804 and another computing device, network, or the like.

Network 821 is configured to connect computing facility 810, and client device 801 with other computing devices, including through wireless network 822 to client devices 802-804. Network 821 may include the Internet in addition to local area networks (LANs), wide area networks (WANs), direct connections, combinations thereof or the like.

Computing facility 810 illustrates one embodiment in which two or more network computing devices provide the various features, services and capabilities of service 120, and which enable the distribution and deployment and management of client software components to client computers 801-804 for execution by users and operation of a tag management service for identifying, tracking and managing the client software components across a product or service life cycle. There are many alternative embodiments for providing the components of service 120 across multiple servers. For example, each of the components of service 120 may be implemented in one or more distinct server computers. As illustrated in FIG. 8, in one embodiment service 120 is implemented as one or more server computers 811 that implement tag management service 126 and one or more other server computers 812 that implement the remaining components of service 120.

While other computer servers 812 are within the scope of system 800, the subject invention is generally focused on tag management service 126, which in system 800 is implemented or embodied by tag management server computer 811. Thus, the following discussion of server configuration will be limited to that of tag management server computer 811, although generally the same principals and design features may be applied to other server computers 812.

Devices that may operate as tag management server computer 811 include, but are not limited to personal computers, desktop computers, multiprocessor systems, microprocessor-based or programmable consumer electronics, network PCs, servers, network appliances, and the like.

Although tag management server computer 811 is illustrated as a distinct network device, the invention is not so limited. For example, a plurality of network devices may be configured to perform the functions of tag management server computer 811. One such configuration is a "server farm" that includes multiple server computers operating cooperatively, each performing some of tag management server computer 811 server functions. One embodiment of the software modules that perform tag management server computer 811 server functions is described with reference to FIG. 2 above.

In certain embodiments, tag management server computer 811 functions may be provided by a cloud computing facility in which the services, features and functions ascribed herein to tag management server computer 811 are delivered as a service over a network, such as the Internet, rather than by a specific server or cluster of servers.

Tag management server computer 811 is capable of running application programs ("applications"). Applications that may be run by tag management server computer 811 include transcoders, database programs, customizable user programs, security applications, encryption programs, VPN programs, web servers, applications servers, account management systems, and so forth. Applications run by tag management server computer 811 may also include a session manager, a tag generator, a client tag manager, a database manager that manages a tag prototype database and a tag instance database and other applications and processes such as those described below with reference to FIG. 2.

Tag management server computer 811 provides web services which include any of a variety of network services that are configured to provide content, including messages, over a network to another computing device. Thus, web services may include an application server, a web server, a messaging server, a File Transfer Protocol (FTP) server, a database server, a content server, or the like. Web services may provide the content including messages over the network using any of a variety of formats, including, but not limited to WAP, HDML, WML, SGML, HTML, XML, cHTML, xHTML, JSON, REST, SOAP or the like. Web services may also include server-side scripting languages such as PHP, Python, and Java servlets. Web services may also include the server side of the Ajax web development method that enables a server to asynchronously respond to Ajax requests.

Tag management server computer 811 includes a computer processor (CPU) and nonvolatile data storage for storing program code and data. Data storage may include virtually any mechanism usable for storing and managing data, including but not limited to a file, a folder, a document, a web page or an application, such as a database, digital media including digital images and digital video clips, and the like.

Data storage may further include a plurality of different data stores. For example, data storage may include a tag prototype database and a tag instance database and other databases such as those described below in conjunction with FIG. 2. Further, data storage may also include network storage or cloud storage in which the physical storage media is accessed across a network.

Tag management server computer 811 further includes a network interface, also referred to as a network adapter, network interface card, or transceiver, for transmitting and receiving digital data across network such as wireless network 822, or network 821.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for using tags to manage and track the activity of client software components across their lifecycle, comprising:
    storing by a server computer a tag prototype database that stores tag prototypes from which instances of tags are generated, each tag corresponding to an instance of a client software component for use in a client computer, wherein a tag includes (1) a serial number that uniquely identifies the instance of a software component, (2) a linkage to an associated entitlement that specifies conditions of usage of the client software component, and (3) session information for client software component sessions;
    generating, by a tag manager, a tag for an instance of a client software component, the tag corresponding to a tag prototype from the tag prototype database;
    storing on a client computer the tag and the client software component;
    receiving a request from the client computer to initiate a session of the client software component;
    verifying, by the tag manager, based at least in part on the tag's serial number, that the client software component is operating within the usage conditions specified in the entitlement associated with the tag;
    tracking, by the tag manager, the use of the client software component across its lifecycle by (1) updating the tag with deployment information, (2) updating the tag with session information when a session is initiated, and (3) updating the tag with session information when a session is terminated.

2. The method of claim 1 wherein the tag further comprises a usage identifier that indicates whether the client software component has been used on the client computer, the method further comprising:
    submitting, by the client computer, a request to initiate a first session of the client software module, to the server computer; and
    updating, by the tag manager, the tag usage identifier to indicate that the client software component has been used.

3. The method of claim 1, wherein the server computer further comprises a tag instance database that stores instances of tags, and wherein tracking the use of the client software component further comprises:
    storing the instance of the tag, in the tag instance database, after it has been updated with deployment information;

storing the instance of the tag, in the tag instance database, after it has been updated with session initiation information; and storing the instance of the tag, in the tag instance database, after it has been updated with session termination information.

4. The method of claim 1 wherein the tag further comprises deployment information selected from the group consisting of location of the deployment, start time of the deployment, ending time of the deployment, and wherein verifying is further based on the deployment information in the tag.

5. The method of claim 1 wherein the conditions of usage specified by an entitlement are selected from a group consisting of:
a time period for use of the client software component;
a time period of support of the client software component;
a period during which content such as a book, movie, audio, or anti-virus profiles, may be accessed; and
the maximum number of users to which the client software component can be provided or fulfilled.

6. The method of claim 1 wherein verifying further comprises:
determining that the client software component has violated at least one of the usage conditions specified by the entitlement associated with the tag.

7. The method of claim 6 wherein verifying further comprises:
issuing an exception message to the entitlement management service with information about the violation of the usage conditions.

8. The method of claim 1 wherein verifying further comprises:
issuing, by the tag manager, a request to an entitlement management service to register the tag against the associated entitlement.

9. A server computer, comprising:
a processor;
a communication interface in communication with the processor;
a data storage for storing (i) a tag prototype database that stores tag prototypes from which instances of tags are generated, each tag corresponding to an instance of a client software component for use in a client computer, wherein a tag includes (1) a serial number that uniquely identifies the instance of a software component, (2) a linkage to an associated entitlement that specifies conditions of usage of the client software component, and (3) session status that indicates the state of a client software component session; and
a memory in communication with the processor for storing instructions, which when executed by the processor, cause the server:
to generate a tag for an instance of a client software component, the tag corresponding to a tag prototype from the tag prototype database;
to store the tag on a client computer;
to receive a request from the client computer to initiate a session of the client software component;
to verify, based at least in part on the tag's serial number that the client software component is operating within the usage conditions specified in the entitlement associated with the tag;
to track the use of the client software component across its lifecycle by (1) updating the tag with deployment information, (2) updating the tag with session information when a session is initiated, and (3) updating the tag with session information when a session is terminated.

10. The server computer of claim 9 wherein the tag further comprises a usage identifier that indicates whether the client software component has been used on the client computer, and wherein the instructions, when executed by the processor, further cause the server:
to receive, from the client computer, a request to initiate a first session of the client software module;
to update the tag usage identifier to indicate that the client software component has been used.

11. The server computer of claim 9 wherein the data storage further stores a tag instance database that stores instances of tags, and wherein tracking the use of the client software component further comprises:
storing the instance of the tag, in the tag instance database, after it has been updated with deployment information;
storing the instance of the tag, in the tag instance database, after it has been updated with session initiation information; and
storing the instance of the tag, in the tag instance database, after it has been updated with session termination information.

12. The server computer of claim 9 wherein the tag further comprises deployment information selected from the group consisting of location of the deployment, start time of the deployment, ending time of the deployment, and wherein verifying is further based on the deployment information in the tag.

13. The server computer of claim 9 wherein the conditions of usage specified by an entitlement are selected from a group consisting of:
a time period for use of the client software component;
a time period of support of the client software component;
a period during which content such as a book, movie, audio, or anti-virus profiles, may be accessed; and
the maximum number of users to which the client software component can be provided or fulfilled.

14. The server computer of claim 9 wherein verifying further comprises:
determining that the client software component has violated at least one of the usage conditions specified by the entitlement associated with the tag.

15. The server computer of claim 14 wherein verifying further comprises:
issuing an exception message to the entitlement management service with information about the violation of the usage conditions.

16. The server computer of claim 9 wherein verifying further comprises:
issuing a request to the entitlement management service to register the tag against the associated entitlement.

17. A system for using tags to manage software across a service or product life cycle, comprising:
a server computer that:
stores a tag prototype database that stores tag prototypes from which instances of tags are generated, each tag corresponding to an instance of a client software component for use in a client computer wherein a tag includes (1) a serial number that uniquely identifies the instance of a software component, (2) a linkage to an associated entitlement that specifies conditions of usage of the client software component, and (3) session status that indicates the state of a client software component session;

generates a tag for an instance of a client software component, the tag corresponding to a tag prototype from the tag prototype database;

updates the tag to reflect events that occur during the life cycle of the client software component;

receives the updated tag from the client computer; and verifies, based at least in part on the tag's serial number that the client software component is operating within the usage conditions specified in the entitlement associated with the tag;

tracks the use of the client software component across its lifecycle by (1) updating the tag with deployment information, (2) updating the tag with session information when a session is initiated, and (3) updating the tag with session information when a session is terminated;

an electronic software distribution computer that distributes the tag and the client software component to a client computer; and a client computer that:

receives the tag and the client software component from the electronic software distribution computer; and sends a request to the server computer to initiate a session of the client software component.

\* \* \* \* \*